United States Patent Office 3,299,748
Patented Jan. 24, 1967

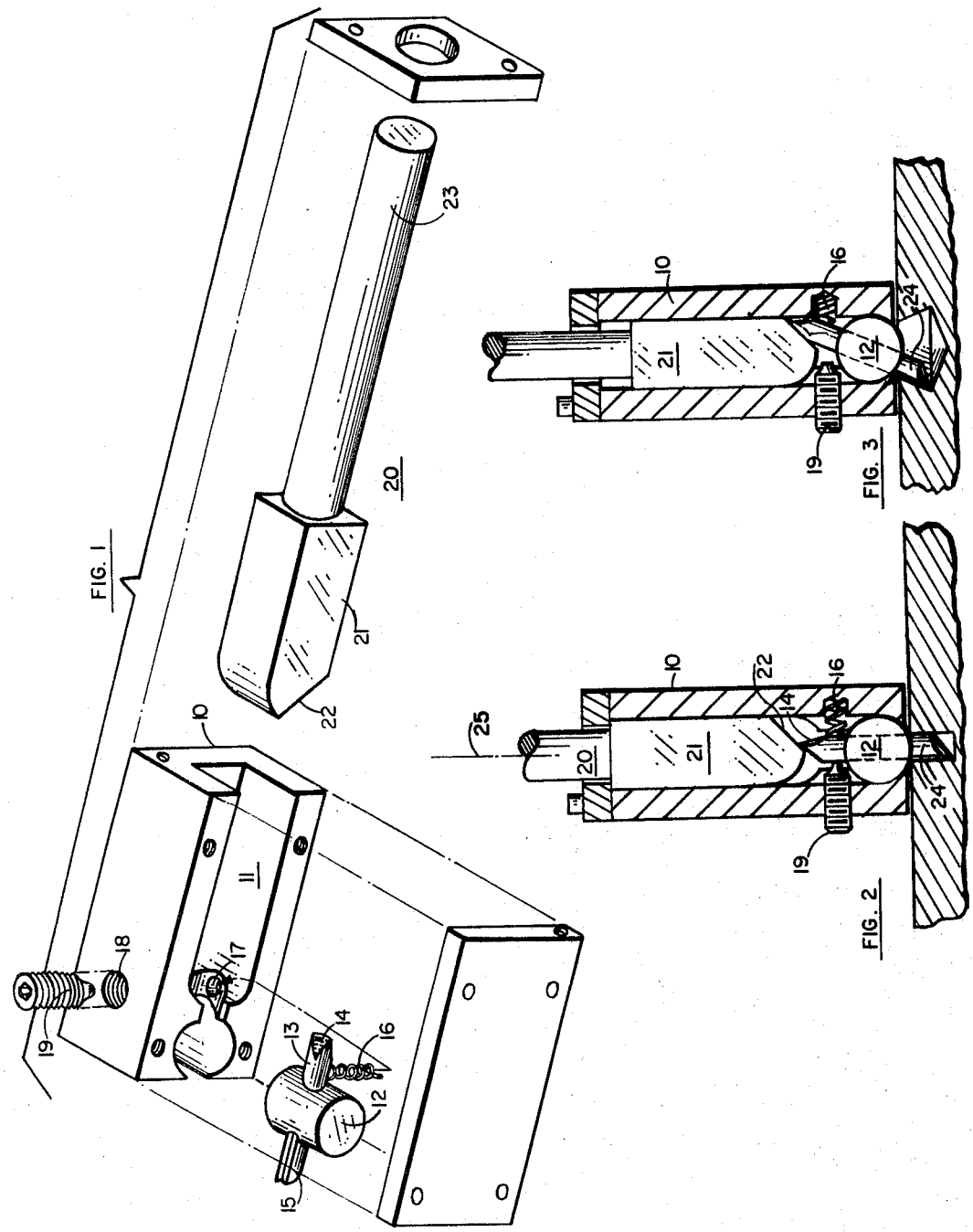

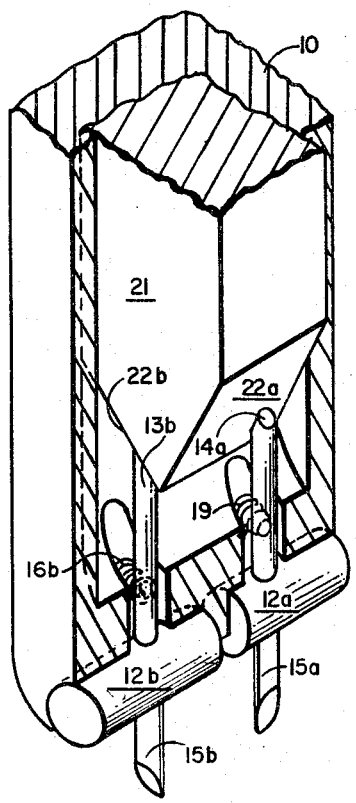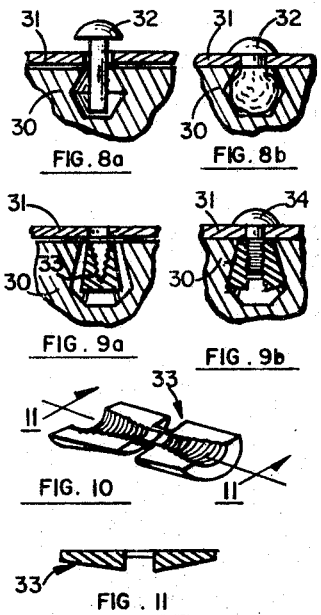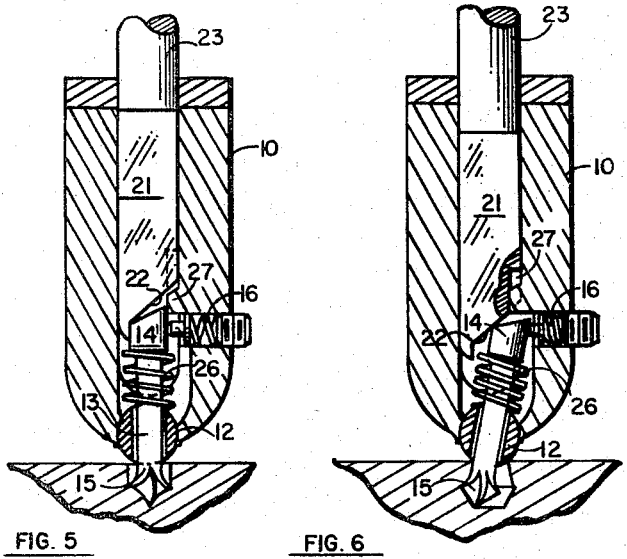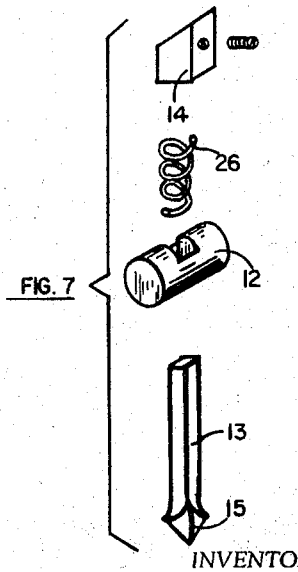

3,299,748
DRILLING TOOLS
Sven L. Moller, 13312 Springdale,
Westminster, Calif. 92683
Filed Mar. 22, 1965, Ser. No. 441,599
4 Claims. (Cl. 77—58)

The subject of this invention relates to an improved drilling tool and more particularly to a tool adapted to drilling a hole resembling a truncated cone, the diameter of the hole progressively increasing with the depth thereof.

In the manufacture and assembly of metal assemblies, it is common to fasten mating pieces together by bolting or riveting such pieces by means of fasteners inserted through holes which completely pierce the pieces to be so joined, the hole in one of the mating pieces being aligned with the hole in the other, when such pieces are held together in the mated position. The combination of a threaded nut and matingly threaded bolt may be used as a fastener combination which is disconnectable. A rivet fastener may be used where a permanent fastener connection is desired which, in high rates of production, has a low unit cost. However, the use of both of such types of fasteners requires that the metal worker or craftsman have access to both the front side and backside of the metal assembly being fastened together by such techniques.

Difficulty has been experienced in the prior art in effecting a blind fastening of two metal work pieces by the above described types of fasteners, where access can be conveniently obtained to only a first or front side of the assembly sought to be secured or joined by means of such fasteners. Also, such types of fasteners, in requiring the making of a hole which completely pierces both pieces to be joined, may be unsuited for fastening an accessory part or fitting to a presently utilized seal-tight vessel such as, for example, in fitting out the hull of a ship afloat, or a metal tank or other container of noxious or dangerous fluids such as gasoline. Such limited access to only one side of an assembly to be secured is known as blind access.

Although welding may be employed under certain circumstances to fasten two mating portions of a metallic assembly, such technique is not necessarily adapted for use for all metals. Also, not all environments are safe enough to allow the presence of a spark or flame associated with welding. Further, for many assemblies to be joined, the combination of the guage or thickness of the metal and the tolerances on the desired geometry do not permit the use of welding as a fast, low cost per unit fastening. Moreover, a welded joint, properly made, tends to be a permanent joint, as to be unsuited in applications where a disconnectible joint is desired.

In the economic manufacture and distribution of metallic assemblies such as metallic furniture, for example, it is frequently desired to minimize the cost of manufacture by either minimizing the cost of assemblying the component parts of manufacture, or else by shipping the parts with the necessary fasteners for assembly by at the point of sales distribution or even by the ultimate consumer, himself. This latter technique, the distribution and sale of the unassembled or "knocked down" product, lends itself to yet further economies, in that the lesser bulk and size of the units to be shipped reduces packaging and transportation costs. However, inexpensive and reliable fastening means are required or at least preferred for ultimate assembly of the product.

In yet other applications of fasteners, requirements exist for a fastener that is both disconnectable and capable of being made by blind access, whereby an assembly can be knocked down for convenient transport and reuse without the additional design retraint of avoiding a blind access fastener problem.

By means of the concept of the subject invention, means is provided for processing a material for a blind access fastener, which may be made disconnectable, and which need not require piercing a base member to which an accessory member of an assembly is to be fastened, thereby avoiding the several disadvantages of the several different types of prior art fasteners.

In a preferred embodiment of the invention, there is provided a rigid longitudinal member having a cutting tool at one extremity thereof, the rigid member being adapted for rotation about an axis of rotation for drilling a hole. There is further provided means responsive to a compressive force applied parallel to said axis of rotation for providing a progressively increased angle between the longitudinal member and the axis of rotation as the depth of a drilled hole progresses.

In normal operation and use of the above described drilling tool, a drilled hole is produced, a portion of which resembles a truncated cone, the truncated portion of which corresponds to the initial depth or start of the hole, thus drilled.

By means of such arrangement, a rivet wedgely driven into such a cavity in a piece of metal to be riveted cannot be extracted therefrom, whereby a secure blind-access fastening can be made. Further, inexpensive flexible threaded fasteners may be inextricably inserted into such a cavity as to provide a female threaded member for a blind-access, detachably-connected fastening. Moreover, such a cavity can be conveniently, quickly and inexpensively drilled out by the use of such tool in a standard drill press or like high production rate means. Accordingly, it is an object of the invention to provide improved means for drilling a hole.

It is another object of the subject invention to provide means for drilling a cavity resembling a truncated cone, the truncate end of which corresponds to the mouth of the cavity.

It is yet another object of the invention to provide means for drilling a hole adapted for making blind access fastenings.

It is still another object of the invention to provide means for efficiently and economically implementing blind access fastenings.

These and other objects of the invention will become apparent from the following description, taken together with the accompanying drawings in which:

FIG. 1 is an exploded view of a device embodying the concept of the invention.

FIGS. 2 and 3 are sectional views of the assembled device of FIG. 1, illustrating the mode of operation thereof.

FIG. 4 is a view of an alternate embodiment of the invention.

FIGS. 5 and 6 are views of yet another embodiment of the device of the invention.

FIG. 7 is an exploded view of the bearing and axially spring loaded tool unit of FIGS. 5 and 6.

FIGS. 8a and 8b illustrate the cooperation of a rivet in fastening two pieces together, one of which has been shaped by means of the concept of the invention.

FIGS. 9a and 9b illustrate the manner of threadably fastening connecting two pieces, of FIGS. 8a and 8b, employing a lag bolt.

FIGS. 10 and 11 illustrate a preferred arrangement of the lag bolt in FIGS. 9a and 9b.

In the figures, like reference characters refer to like parts.

Referring now to FIG. 1, there is illustrated an exploded view of the device of the invention. There is provided a housing 10 having a longitudinal cavity 11, and a roller bearing 12 adapted for being mounted at one longitudinal extremity of housing 10 for supporting rotation about an axis fixed relative to the housing and transverse of the longitudinal axis of cavity 11. A cutting tool 13 is mounted through roller bearing 12, transverse to the axis of rotation thereof, a first longitudinal extremity 14 of tool 13 being tapered and extending into the interior of cavity 11 of housing (when assembled as shown in FIGS. 2 and 3), the distal end 15 of tool 13 being exterior of housing 10 and comprising the working end of a cutting tool.

There is also provided a spring 16 adapted for insertion into a transverse cavity 17 of the interior of housing 10, which cavity extends perpendicular to the axis of rotation of bearing 12 and bears against tool 13 for providing a spring load torsion means for rotationally urging the tool about the rotational axis of bearing 12 and against a set pin 19 threadingly inserted into a transverse cavity 18 in housing 10 and opposite cavity 17. By adjusting the extent to which pin 19 is inserted into cavity 11, spring 16 and pin 19 maintain tool member 13 in alignment with the longitudinal axis of housing 10, as shown more clearly in FIG. 2.

Referring again to FIG. 1, there is further provided a longitudinal push rod 20 having an inserted portion 21 slidably and nonrotatably mounted within cavity 11 of housing 10, an extremity 22 of inserted portion 21 being wedge-shaped, the edge of which is parallel to the transverse axis about which bearing 12 and tool 31 rotate. The wedge face 22 of push rod 20 is adapted to engage the tapered extremity 14 of tool 13 when assembled (as shown in FIGS. 2 and 3).

Because of the nonrotatable nature of the slidable cooperation between push rod 20 and housing 10, the entire assembly of pieces (when assembled as shown in FIG. 2), will rotate together in the manner of a drilling tool, when the distal end 23 of push rod 20 is mounted in the rotating chuck of a drill press.

When the working end 15 of tool 13 is inserted into an accommodating hole drilled into a work piece-to-be-shaped 24, until the bearing surface of the assembly about the face of the work piece, as shown in FIG. 2, a compressive axial load may then be applied along the longitudinal axis of push rod 20 by means of the ordinary operation of the drill press, as is well understood in the art. Upon engagement of the face 22 of push rod 20 with the tapered end 14 of tool 13, a force is exerted upon tool 13, a resolved transverse component of which force produces a torque or moment which overcomes that provided by the preload spring 16, resulting in rotation of tool 13 about the transverse axis of rotation, as shown in FIG. 3, the consequent change in the angular orientation of tool 13 relative to housing 10 results in a further shaping or cutting-out of the hole in workpiece 24, as shown in FIG. 3, the shape of which corresponds to a truncated cone, the radius of which increases with an increase in depth. Upon removal of the compressive axial force, preload spring 16 acts to restore tool 13 to the orientation shown in FIG. 2.

Although the device of FIGS. 1, 2 and 3 has been described as being used to shape a conventionally-drilled cylindrical hole in a work piece into a conical shape, the device may be used to concomitantly drill out and shape a hole in a work piece in a single drill press operation. Such combined function may be effected by firm and rapid operation of the drill press, whereby a progressively increased axial force is applied to overcome the resistance of the workpiece.

Where the lateral cutting edge 24 of the tool is laterally offset from the axis of rotation of the push rod 20, then rotation of the assembly of FIG. 2 will tend to result in the cutting out of a hole, as illustrated. Further, the application of an axial force between push rod 20 and tool 13 to overcome the resistance of the workpiece, as the cutting tool is forced downwardly therein, causes tool 13 to be rotated up against the spring load, thereby conically shaping the drilled hole, as shown in FIG. 3. Hence, the invention may be employed either to shape a drilled hole or to drill a shaped hole, the resultant shape resembling a truncated cone.

In order to reduce tool wear, two cutting tools may be employed, as shown in FIG. 4.

Referring to FIG. 4, there is illustrated in partially sectioned view of an alternate embodiment of the invention, for which the inserted portion 21 of the push rod is symmetrically shaped with two opposite wedge faces 22a and 22b. There are further provided two roller bearings 12a and 12b each oppositely mounting a respective spring-loaded tool 13a and 13b, having a tapered end 14a and 14b adapted to engage a mutually opposite one of the wedge faces 22a and 22b. Hence, upon downward actuation of element 21, each of tool taps 15a and 15b is rotated in a mutually opposite direction about the common axis of rotation of bearings 12a and 12b.

Still another embodiment of the invention, assuring positive conical shaping action, is shown in FIGS. 5 and 6.

Referring to FIGS. 5 and 6, there are illustrated vertical sections of an alternate embodiment of the device of the invention for providing positive actuation of the shaping mode of the tool operation. The device of FIGS. 5 and 6 is similarly constructed and arranged as the device of FIGS. 1, 2 and 3, but for the inclusion of certain additional structural features. First, the tool member 13 is slidably and nonrotatably mounted within roller bearing 12, rather than being fixed thereto (as shown more clearly in FIG. 7). Also, the tapered end 14 of tool 13 is further shaped to provide a collar for retaining a compressed spring or other axial preload means 26 against bearing 15. There is also provided a longitudinal shoulder 27 on the inside of housing 10, on the same side thereof as, and located above, transverse preload spring 16.

In normal operation of the arrangement of FIGS 5 and 6, and in a drill press, the tool tip 15 is forced down into a work piece until bearing element 12 is seated upon the face of the work piece, thereby causing a cylindrically shaped hole to be drilled, as shown in FIG. 5. The cooperation of the left tip of push rod extremity 22 and longitudinal shoulder 27 with tapered end 14 of tool 13 prevents lateral motion thereof. As a further compressive force is downwardly exerted upon the rotating push rod element 23, such force is transmitted to tool 13, resulting in an incremental downward sliding motion of tool 13 relative to bearing 12. This incremental downward motion slightly increases the depth of the cylindrical hole being formed in FIG. 5, incrementally compresses axial spring 26, and also results in the upper end 14 of tool 13 being positioned below the extent of shoulder 27. Because shoulder 27 no longer provides a lateral restraint upon tool edge 14 in such lower axial position, wedge face 22 and tapered tool end 14 cooperate to rotate tool 13 about the transverse rotational axis of bearing 12 and against transverse preload spring 16, as shown in FIG. 6. Hence, the cylindrical hole, formed in the initial mode of operation (shown in FIG. 5) is now affirmatively shaped in the desired conical shape illustrated in FIG. 6, in a manner substantially independent of the speed of the machine and of the qualities of the work material being shaped.

Upon release of the compressive load or axial force exerted by the drill press upon push rod 20, transverse spring 16 restores tool 13 to an alignment parallel with the longitudinal axis of push rod 20, and axial spring 26 pushes tool 13 upwardly into sliding engagement with shoulder 27, thereby tending to retract the cutting edge of tool 13.

The manner of fastening two workpieces, one of which has been shaped in accordance with the concept of the invention, is shown in FIGS. 8a and 8b and FIGS. 9a and 9b.

Referring to FIGS. 8a and 8b, there is illustrated a center section of a work piece 30 having a hole shaped in accordance with the teaching of the inventive concept, and aligned with a cylindrical hole in a second workpiece 31 to-be-fastened by means of a rivet 32 inserted thru the two holes. Upon the striking the head of malleable rivet 32, axial compression of the rivet against work piece 30 causes the foot of rivet 32 to flatten out, as shown in FIG. 8b. In such condition the rivet is inextricable from workpiece 30, whereby pieces 30 and 31 are fastened together.

In FIGS. 9a and 9b a disconnectable connection of the workpieces is shown. A style of lag bolt 33 being inserted in the shaped hole of work piece 30, as shown in FIG. 9a; and a screw fastener, or male-threaded member 34 employed, in lieu of the rivet of FIGS. 8a and 8b, for fastening the workpieces 30 and 31.

Lag bolt 33 is preferably stamped out or coined as a single piece of coin metal comprising two opposing longitudinal sections or half shells, in a dual half-shell arrangement along a common longitudinal axis, the upper ends of the half shells being joined at two corresponding portions by a slender bridge 35 of metal, as shown in FIG. 10 and the vertical center section thereof, shown in FIG. 11. In order to use the device of FIGS. 10 and 11 in the manner shown in FIGS. 9a and 9b, the bridge 35 is simply and easily deformed by hand pressure or manual force about a central portion thereof, thereby tending to mate the two half shell sections as an integral cylindrical section.tion. Longitudinal keys or external lands 36 extending longitudinally along the external sides of the half shell sections provide means of nonrotatably securing or anchoring the lag bolt within the utilizing work pieces. By striking or hammering the protruding end of the inserted lag bolt, the keys or lands are driven into engagement with the interior sides of the drilled-out workpiece. Hence, upon introduction of the screw member 34, positive threaded engagement therewith may be made. The progressive insertion of screw 34, not only breaks the bridge 35, of course, but also further drives the keyed sides or lands 36 into engagement with the sides of the shaped workpiece 30 of FIG. 9b.

Hence, it is to be appreciated that a highly useful tool has been described for forming holes representing a truncated cone, the formation of holes of which shape is of special value in the fastener arts and in the maufacture of pieces to be assembled.

Although the invention has been described and illustrated in detail, it is to be clearly understood that the same is by way of example only, and not by way of limitation, the spirit and scope of this invention being limited only by the terms of the appended claims.

I claim:

1. Means for drilling a hole comprising

A rigid longitudinal member adapted for rotation about an axis of rotation, one extremity of which member comprises a cutting tool having a cutting edge laterally displaced relative to said axis of rotation, the other extremity of which is torsionally spring loaded against rotation of said member about an axis transverse of said axis of rotation, said tool being axially spring loaded against axial motion perpendicular to said transverse axis; and Longitudinal guide means of limited longitudinal extent for laterally restraining said rigid member, Means responsive to a axially comprevise force applied parallel to said axis of rotation for succesively axially moving said rigid member free of said lateral restraint and then applying a torque upon said spring loaded member for angularly inclining said longitudinal member relative to said axis of rotation.

2. Means for drilling a hole resembling a truncated cone and having a diameter which progressively increases with the progressive depth of said hole, comprising:

A housing having a longitudinal internal cavity of limited transverse extent;

A longitudinal tool member having a first end thereof inserted in a first end of said cavity and pivotally, spring-loadedly mounted within said cavity for spring loaded rotation about an axis fixed relative to said housing and transverse of a longitudinal axis of said longitudinal cavity, said rotation being limited by the transverse extent of said cavity, a distal end of said tool member comprising a cutting tool; and A push rod having a first end thereof slidably and non-rotatably mounted in a second end of said cavity of said housing and a second end external of said housing and adapted for mounting in a drill chuck, said first inserted end of said push rod having a wedge shaped edge in a transverse direction parallel to said transverse axis of rotation, and adapted for urging said spring loaded tool member about said transverse axis upon the application of an axial compressive force upon said distal end of said rod.

3. A drilling tool for drilling a hole of a progressively increased radius as the depth of said hole progresses, and comprising A housing having a longitudinal cavity therein;

A roller bearing mounted at one longitudinal extremity of said housing for supporting rotation about an axis fixed relative to said housing and transverse of the longitudinal axis of said cavity;

A cutting tool mounted through said roller bearing, a first longitudinal extremity thereof being tapered and extending into the interior of the cavity of said housing, the distal end of said cutting tool being exterior of said housing and comprising the working end of said cutting tool, Spring load means for urging the angular orientation of said cutting tool into alignment with the longitudinal axis of said housing, A longitudinal push rod having an inserted portion slidably and non-rotatably mounted within said cavity of said housing and a portion exterior of said housing and adapted to be mounted in a drill chuck, an extremity of said inserted portion being wedge-shaped, the edge of which is parallel to said transverse axis, and a wedge face of which engages said tapered extremity of said cutting tool, whereby upon the application of a compressive axial force upon said rod, said wedge face causes said cutting tool to be rotated about said transverse axis against said spring load means.

4. In combination

A housing having a longitudinal internal cavity,

A cutting tool comprising a longitudinal member of less thickness than the thickness of the cavity in said housing, a portion of the longitudinal length said cutting tool being inserted into said cavity of said housing, and slidably pivotally mounted for rotation about an axial motion perpendicular to a transverse axis transverse of and fixed relative to said cavity of said housing;

Lateral spring loading means cooperating with said casing and said tool tending to maintain said tool in axial alignment with said longitudinal axis of said housing, Said casing including a longitudinal shoulder internally thereof and of limited longitudinal extent for laterally bearing said laterally spring loaded tool, axial spring loading means cooperating with said casing and said tool for axially sliding said axially slidable tool into engagement with said shoulder of limited longitudinal extent, A push rod, a portion of the length of which is slidably and non-rotatably mounted in the internal cavity of said housing, one exposed end being adapted for mounting within the chuck of a rotary drill press and a second inserted end of said rod being wedge faced in a direction parallel to said transverse axis for laterally engaging an inserted end of said tool, whereby the progressive application of an externally applied compressive load upon said push rod causes said cutting tool to be first externally axially extended perpendicular to and then rotated about said transverse axis.

References Cited by the Examiner

UNITED STATES PATENTS

| | | |
|---|---|---|
| 858,752 | 7/1907 | Potter. |
| 1,536,208 | 5/1925 | Gosper. |
| 2,544,444 | 3/1951 | Clark. |

FOREIGN PATENTS 520,510  1/1956  Canada.

WILLIAM W. DYER, JR., *Primary Examiner.*

G. A. DOST, *Assistant Examiner.*